2,753,362

PROCESS OF EXTRACTING LIPIDS FROM PLANT AND ANIMAL TISSUE

Joseph L. Owades, Brooklyn, and Orville N. Breivik, Millwood, N. Y., assignors to Standard Brands Incorporated, New York, N. Y., a corporation of Delaware No Drawing. Application May 18, 1951,
Serial No. 227,113

7 Claims. (Cl. 260—397.25)

This invention relates to a method of extracting lipids from plant and animal tissue. More particularly it pertains to the extraction of steroils and phospholipids from yeast.

The object of the invention is the provision of a method of extracting lipid substances from plant and animal tissue containing the same in a convenient, efficient and economical manner in a relatively pure form.

Another object of the invention is to provide such a method which will give yields of lipid substances approximating the theoretical and enable the recovery of the residual raw material in a form substantially unchanged chemically and suitable for use as a food for human or animal consumption.

A specific object of the invention is to provide a process for the extraction of sterols from yeast.

Plant and animal tissues contain lipids. These lipids comprise fats, sterols and phospholipids. It has been common practice to extract these substances from the tissue by means of alcohols, for example, menthanol, ethanol and isopropanol, or fat solvents which are less eluotropic than the alcohols, such as ethyl ether, petroleum ether, acetone, ethyl acetate, benzene, toluene, methylene chloride, chloroform, ethylene dichloride, trichloroethylene and mixtures of such solvents. These fat solvents, including the alcohols, are termed "extracting agents" hereinafter for convenience.

In the case of some plant and animal tissue such extracting agents are capable of extracting all or nearly all of the lipid content of the tissue. However, in the case of other tissue, for instance microorganisms such as yeast, these extracting agents fail to extract a large portion of the lipid content. For example, they extract only about one half of the sterols from yeast. In such cases, hydrolysis of the tissue with acids, alkalies or enzymes has been resorted to prior to the extraction. While higher yields of lipids may be obtained in this manner some of the other constituents of the yeast are converted into undesirable substances, with the result that the residue from the extraction has practically no utility. Moreover, some of the hydrolytic products are extracted along with the lipids and contaminate the lipid fraction.

In microorganisms such as yeast, molds, fungi and bacteria, the lipids, and particularly the sterols, to a large extent are closely associated or bound with the protein or other cell constituents and it is probably for this reason that a substantial proportion of the lipid content of such tissue cannot be extracted with the common extracting agents. We have found that a much larger proportion of the lipids can be extracted if the tissue is treated with certain substances, hereinafter called "lipophaneretic agents" (Animal Review of Biochemistry, vol. 18 (1949), p. 108) for convenience, which appear to have the property of dissociating the lipids from the aforementioned combinations with protein or other cellular constituents. Substances having this property are the fat solvents which dissolve water and which are more eluotropic than methyl alcohol, and particularly the water miscible fat solvents which are more eluotropic than methyl alcohol. The term "eluotropic" is used herein to mean the ability to elute, wash out or dissolve from an adsorbent or binding material. Lipophaneretic agents found to be effective include the aliphatic acids having from 1 to 12 carbon atoms, the anhydrides of these acids, for example acetic anhydride, the amides of these acids including the N-mono alkyl and N-dialkyl substitution products thereof, for instance acetamide and dimethyl formamide, pyridine, pyridine homologues and morpholine. The short chain aliphatic acids give better results than those having long chains and accordingly we prefer to use those having from 1 to 8 carbon atoms, especially acetic and propionic acids. Other suitable acids include formic, butyric, isobutyric, caproic, caprylic and lauric acids.

In the practice of the invention the lipids may be extracted from tissue containing the same in a number of ways. Some lipophaneretic agents like acetic acid, for example, dissolve lipids sufficiently so that they can serve both to dissociate the lipids from the cell constituents and to extract them. In this case it is not necessary to use the aforementioned extracting agents and it suffices to mix the lipophaneretic agents with the tissue, allow the same to act on the tissue for a short time, separate the liquid and recover the lipids therefrom.

If the lipophaneretic agent is not a good solvent for the lipids it is desirable to use in addition one or more extracting agents. In this case as well as in case the lipophaneretic agent is a good solvent for the lipids, the tissue may be treated first with the lipophaneretic agent and then the mixture may be extracted with the extracting agent or the tissue may be treated with both agents simultaneously.

It is desirable, although not necessary, to dry the tissue before it is treated in accordance with the invention because the presence of relatively large amounts of water interferes with the extraction.

Some improvement in extraction can be obtained with very small amounts of the lipophaneretic agent. For instance a significant improvement was obtained when one part by weight of powdered or flaked dry yeast was mixed with 0.1 part by weight of glacial acetic acid and the mixture extracted with an extracting agent. For best results, however, it is advisable to use larger amounts. The amount required to give the best results will depend upon a number of factors including the nature of the tissue, the amount of water it contains and the character of the lipophaneretic agent.

This invention is illustrated by the following specific examples:

*Example 1*

15 g. of dry yeast were extracted exhaustively with 150 ml. of ethyl ether in a Soxhlet apparatus. Analysis of the dry yeast residue for ergosterol showed it to contain 66% of the ergosterol initially present in the yeast used as starting material.

Another 15 g. portion of the same dry yeast was stirred with 100 ml. of glacial acetic acid at room temperature for a few minutes, was transferred to a Soxhlet thimble and was extracted exhaustively with 150 ml. of ethyl ether in a Soxhlet apparatus. Analysis of the dry yeast residue showed it to contain 2% of the ergosterol which was in the yeast used as starting material.

*Example 2*

10 g. of dry yeast were extracted with 150 ml. of pyridine in a Soxhlet apparatus. Analysis of the dry yeast residue showed it to contain 2% of the ergosterol present in the yeast used as a starting material.

Example 3

A mixture of 50 g. of dry yeast and 100 ml. of dimethyl formamide was heated in a boiling water bath for 1 hour. A portion of the mixture was transferred to a Soxhlet thimble and extracted with 150 ml. of absolute ethanol in a Soxhlet apparatus. The residual dry yeast was found to contain 15% of the ergosterol which had been present in the yeast used as starting material.

Example 4

500 g. of dry yeast were mixed with 1000 ml. of glacial acetic acid and from the mixture 800 ml. of acetic acid was distilled under reduced pressure. The residual yeast-acetic acid mixture was extracted with three 1-liter portions of boiling denatured ethanol. To the ethanol extracts sufficient KOH was added to neutralize acetic acid and provide sufficient excess alkali for saponification. After concentration and saponification, unsaponifiable matter was isolated and was found to contain 94% of the ergosterol which was present initially in the yeast. There was also isolated 443 g. of yeast residue, unchanged in appearance, which was found to contain substantially all of the protein and nucleic acid and a major proportion of the B-complex vitamins which were present in the yeast used as starting material.

Example 5

20 kg. of dry yeast were thoroughly mixed with 12 kg. of glacial acetic acid and the mixture was extracted in a 5-stage counter-current extraction apparatus with 60 kg. of isopropanol at 80–90° C. and 60–90 p. s. i. pressure. The liquid extract was concentrated by distillation under reduced pressure to 4 kg. and was then taken up in 8 liters of Skellysolve B (hexane B. P. 60–71° C.) and washed with three 1 kg. portions of water. The Skellysolve B layer was then concentrated by distillation to 3 kg. 593 g. of phospholipids were precipitated by the addition of 12 liters of acetone. Acetone was distilled and the residue saponified by refluxing with alcoholic KOH. Upon cooling and filtration there was obtained a crude sterol press cake weighing 576 g. which contained 85% of the ergosterol which was present in the yeast used as a starting material.

Example 6

647 g. of dry yeast were thoroughly mixed with 353 g. of glacial acetic acid and the mixture was extracted with six successive 1 kg. portions of Skellysolve B at room temperature. The Skellysolve B extract could be separated from the yeast either by decantation or filtration. The yeast residue was found to contain 10% of the ergosterol which was present in the yeast used as starting material.

Since certain changes may be made in the above process which embodies the invention without departing from its spirit or scope, it is intended that all matter contained in the above description shall be interpreted as illustrative and not in a limiting sense. It is also to be understood that the following claims are intended to cover all of the generic and specific features of the invention herein described.

We claim:

1. In a process of extracting lipids from plant and animal tissue containing bound lipids which cannot be extracted by exhaustive extraction with ethyl alcohol, the step of treating the tissue under substantially anhydrous conditions with a lipophaneretic agent of the group consisting of monobasic aliphatic acids having from 1 to 12 carbon atoms, the anhydrides of these acids, the amides of these acids, the N-alkyl substitution products of these amides, pyridine, pyridine homologues and morpholine whereby the lipids are dissociated from their combinations with other components of the tissue.

2. A process as claimed in claim 1, wherein the mixture of tissue and lipophaneretic agent is extracted with a lipid solvent.

3. In a process of extracting lipids from plant and animal tissue containing bound lipids which cannot be extracted by exhaustive extraction with ethyl alcohol, the step which comprises treating the tissue under substantially anhydrous conditions with a mixture of a lipid solvent and a lipophaneretic agent of the group consisting of monobasic aliphatic acids having from 1 to 12 carbon atoms, the anhydrides of these acids, the amides of these acids, the N-alkyl substitution products of these amides, pyridine, pyridine homologues and morpholine.

4. In a process of extracting sterols from plant and animal tissue containing bound sterols which cannot be extracted by exhaustive extraction with ethyl alcohol the steps of treating the tissue under substantially anhydrous conditions with a monobasic aliphatic acid having from 1 to 12 carbon atoms and extracting the sterols from the so treated tissue with a sterol solvent.

5. In a process of extracting sterols from microorganisms the steps of treating the microorganism with a monobasic aliphatic acid having from 1 to 12 carbon atoms under substantially anhydrous conditions and extracting the sterols from the so treated microorganisms with a sterol solvent.

6. In a process of extracting sterols from yeast the steps of treating dry yeast with a substantially anhydrous monobasic aliphatic acid having from 1 to 8 carbon atoms and extracting the sterols from the so treated yeast with a sterol solvent.

7. In a process of extracting ergosterol from yeast the steps of treating dry yeast with glacial acetic acid and extracting the mixture with an ergosterol solvent.

References Cited in the file of this patent

UNITED STATES PATENTS

| Number | Name | Date |
| --- | --- | --- |
| 987,133 | Haberman et al. | Mar. 21, 1911 |
| 2,150,732 | Thurman | Mar. 14, 1939 |
| 2,220,114 | Natelson | Nov. 5, 1940 |
| 2,273,046 | Julian | Feb. 17, 1942 |
| 2,362,932 | Rosenburg | Nov. 14, 1944 |
| 2,390,528 | Freeman | Dec. 11, 1945 |
| 2,394,615 | Jenkins | Feb. 12, 1946 |
| 2,563,235 | Gould | Aug. 7, 1951 |
| 2,598,468 | Vaterrodt | May 27, 1952 |
| 2,610,195 | Gerbert | Sept. 9, 1952 |

FOREIGN PATENTS

| Number | Country | Date |
| --- | --- | --- |
| 613,778 | Great Britain | Dec. 2, 1948 |
| 957,787 | France | Feb. 1950 |